ELECTRONIC PULSE SCALING CIRCUITS

Filed April 15, 1955 2 Sheets-Sheet 1

Nov. 18, 1958 E. H. COOKE-YARBOROUGH 2,861,201

ELECTRONIC PULSE SCALING CIRCUITS

Filed April 15, 1955 2 Sheets-Sheet 2

United States Patent Office 2,861,201

Patented Nov. 18, 1958

2,861,201

ELECTRONIC PULSE SCALING CIRCUITS

Edmund Harry Cooke-Yarborough, Longworth, England, assignor, by mesne assignments, to the United States of America as represented by the United States Atomic Energy Commission Application April 15, 1955, Serial No. 501,653

4 Claims. (Cl. 307—88.5)

This invention relates to electronic pulse scaling circuits of the kind comprising a series of bi-stable elements connected in sequence, usually in the form of a ring so as to be cyclically repetitive at the highest scaling factor.

Four bistable elements can readily be arranged to give a scaling factor of $2^4$ i. e. 16 if the elements are of a type capable of being changed over from one stable state to another and vice versa by an output pulse from a preceding element when said preceding element itself changes state in one direction only.

A point type transistor can be connected to form a bi-stable element the advantages of which are well known but it cannot be satisfactorily changed from the conducting to the non-conducting state i. e. turned-off, unless additional circuit elements are provided in association with each element to generate powerful turn-off pulses.

It would therefore be an advantage in a scaling circuit comprising a plurality of transistors as the bi-stable element if a common turn-off pulse generator could be used but in the known circuits in which this can be done a scaling factor no higher than the number of elements is obtained. For example, a ring-of-four may be arranged to provide a scale of four by arranging for one element only to be on at any one time and for that element to turn-on the succeeding element when it turns off. Thus by causing the input pulses to apply a turn-off pulse to all the elements, the "on" condition is circulated around the ring once every four input pulses.

An object of the present invention is to provide a scaling circuit in which a common turn-off pulse is employed and yet which for a given scaling factor is more economical in the number of elements required.

According to the present invention a scaling circuit comprises a ring system of bi-stable elements each arranged on turn-off to cause a succeeding element of the ring to be turned-on and one being arranged on turn-off to cause a further element of the ring to be turned-on, means for applying a turn-off pulse to all the elements simultaneously and means for resetting the elements to a starting condition at the end of each cycle.

Figure 1:
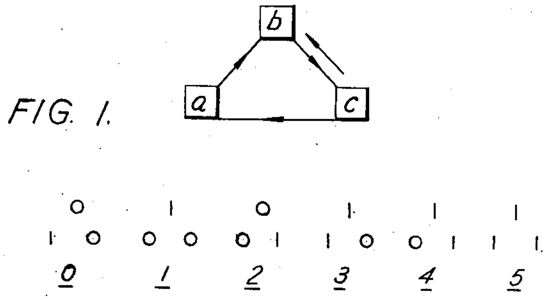
Figure 2:
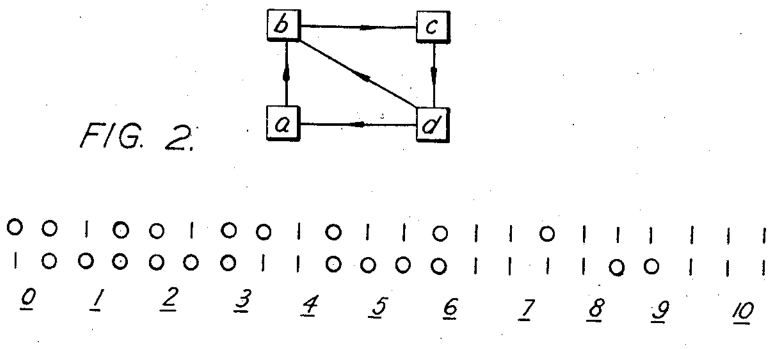
Figure 3:
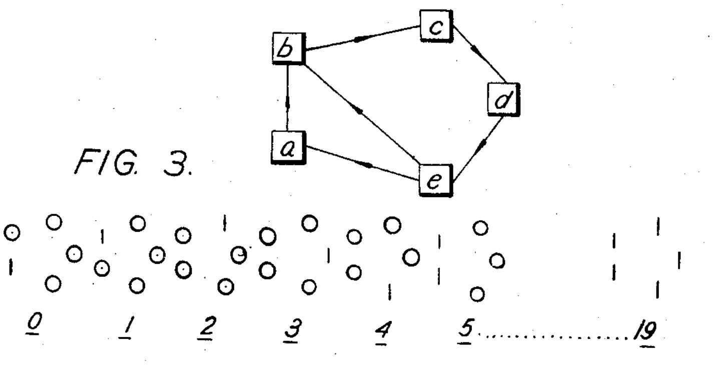
Figure 4:
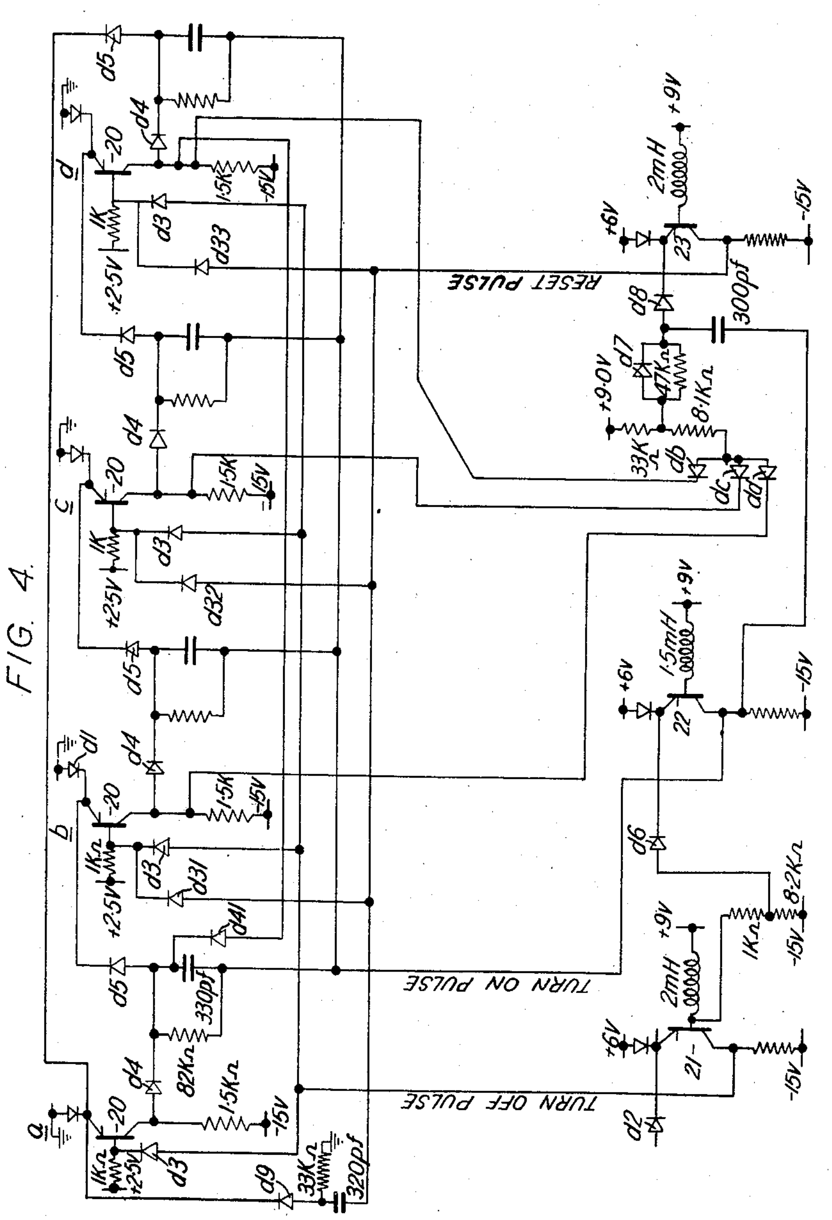

The invention will now be further described with reference to the accompanying drawing wherein:

Figs. 1 to 3 are diagrams of ring scalers of 3, 4 and 5 elements in accordance with the invention providing scales of 6, 11 and 18 respectively, and Fig. 4 is a circuit diagram of an embodiment of the invention. Referring to Fig. 1, three bi-stable elements *a*, *b* and *c*, such as transistors, are connected clockwise in a ring such that when any one is turned-off it prepares a circuit for turning on the next succeeding element and, in addition, element *c* prepares a circuit for turning on element *b*. Means, not shown for the sake of clarity, are provided for turning-off all the elements simultaneously when a pulse of a series to be counted is fed to the circuit and for turning on those whose circuits have been prepared.

Let it be assumed that in an initial condition element *a* is on and elements *b* and *c* are off as indicated over the reference 0. An input pulse will turn-off element *a* and is merely ineffective with respect to elements *b* and *c*, since they are already off, but element *b* is turned-on (indirectly as described later) by the turn-off of element *a*. Hence the receipt of one pulse produces the condition indicated over the reference 1. A second pulse turns-off element *b* with the result that element *c* is turned on, as indicated at 2. A third pulse turns-off element *c* consequently, due to the double connection from element *c*, both elements *a* and *b* are turned on as indicated at 3. A fourth pulse moves the position of the two "on" conditions one step and a fifth pulse causes all three elements to be turned-on as indicated at 5. By means of a suitable coincidence circuit, the scaler can be caused to be reset to the initial condition 0 when condition 5 obtains since it is unique for *a* and *c* to be on together. Thus three bi-stable elements provide a scale of six using a common turn-off pulse. A scale of seven could be obtained by starting with all the elements off and causing the first pulse to turn-on element *a*.

The above example of the invention was chosen as the first to be described since it was the simplest of its kind.

Two further examples of the invention employing four and five elements are illustrated diagrammatically in Figs. 2 and 3 respectively. Their method of operation is similar to that of Fig. 1 and will be readily understood by reference to the codes associated with each figure. Fig. 2 provides a scale of up to 12 and Fig. 3 a scale of up to 19. Fig. 2 adapted to provide a scale of 10 is the preferred embodiment, having regard to its more general application in decimal counting systems, and a practical circuit arrangement based on Fig. 2 will now be described with reference to Fig. 4.

Each bi-stable element *a*, *b*, *c* and *d* comprises a point type transistor 20 associated with a circuit adapted to be stable in both the "on" and "off" conditions.

Each circuit comprises a resistor 1K through which the base electrode is connected to a positive voltage source +2.5V, a diode *d*1 through which the emitter electrode is connected to earth and a load 1.5K through which the collector electrode is connected to a negative voltage source −15V. It will be appreciated that the references which are given to the components are indicative of the values of those components where applicable.

The circuit is such that a current greater than $I_{co}$ (the residual collector current at turn-off) passes into the base electrode from the source +2.5V. The circuit is clearly able to keep the transistor in the "off" condition indefinitely since the emitter is grounded. It may be triggered to the "on" condition by a positive pulse on the emitter which causes the collector current to exceed the emitter current by the amount of current flowing through resistor 1K. To be stable in this "on" condition the load current must exceed a critical value which is generally two to three times the base current and the circuit constants shown are such as to provide this. The circuit is returned to the stable "off" condition by supplying a positive turn-off pulse to the base electrode.

The turn-off pulses are derived from the collector electrode of a transistor 21 arranged in a circuit similar to that of the bi-stable elements so as to provide a powerful positive pulse at the collector electrode when triggered by a positive incoming pulse on the emitter through diode *d*2 but self restoring under the action of an inductance 2 mH in the base electrode circuit. When the transistor is "on" the inductance causes the base current to rise steadily until it restores the transistor 21 to the "off" condition soon after it is triggered.

The turn-off pulse is applied through diodes *d*3 to the base electrodes of each of the transistors 20. Any one or more of said transistors 20 which was "on" has already caused a condenser 330 pf. to charge through a diode *d*4. After the turn-off pulse has ended each condenser 330 pf. receives a turn-on pulse from the collector electrode of a transistor 22 which turn-on pulse causes any charged condenser to discharge through a diode *d*5 to the emitter electrode of the transistor 20 in the following element *a*, *b*, *c* or *d* as the case may be. Transistor 20 of element *d* however also charges the condenser 330 pf. between elements *a* and *b* through diode *d*41 and thus diode *d*41 constitutes the "cross connection" shown in Fig. 2.

Each condenser 330 pf. is shunted by a resistor 82K to minimise the effects of back leakage in the diodes. The turn-on pulses are generated by a transistor 22 arranged in a pulse-generating circuit similar to that of transistor 21 and triggered by a pulse from the base electrode thereof through diode *d*6 after having been stepped down by potentiometer 1K, 8.2K.

The circuit above described is capable of the sequence of operations shown in relation to Fig. 2 up to the tenth condition. Means will now be described, however, whereby condition 9 causes the transistor to be reset to condition 0 to provide a scale of 10.

Condition 9 of Fig. 2 is unique in that transistors *b*, *c* and *d* are conducting. Consequently their collector electrodes are at maximum potential and this is used to cut-off a circuit from a positive source +9.0V through potentiometer 33K, 8.1K and diodes *db*, *dc* and *dd* in parallel. When all three of these diodes are non-conducting the voltage at the tapping point on potentiometer 33K, 8.1K becomes more positive, condenser 300 pf. charges through diode *d*7 and a positive pulse is transmitted from transistor 22 through condenser 300 pf. and diode *d*8 to the emitter electrode of a transistor 23 which provides a positive pulse at its collector electrode. This positive pulse is applied as a reset pulse through diodes *d*31, *d*32 and *d*33 to the base electrodes of transistors 20 of elements *b*, *c* and *d* to turn said transistors 20 "off" and through condenser 320 pf. and diode *d*9 to the emitter electrode of transistor 20 of element *a* to turn said transistor "on." The elements are thus reset to condition 0 shown in Fig. 2. Transistor 23 can be used to provide the turn-off pulses for a second scale of 10.

In a modification transistor 22 is dispensed with and the turn-on pulses are generated by a secondary winding on the inductance 2 mH in the base circuit of transistor 21.

The invention has been described with particular reference to transistors as the bi-stable elements of the invention. Any other form of bi-stable element or circuit capable of being switched from one stable state to another stable state and vice versa by an applied pulse may be used for the purpose of the invention, one state being designated the turned-off state and the other the turned-on state. Examples of such elements and circuits are saturable magnetic cores, ferromagnetic or ferro-electric devices, thermistors, relays, gas-filled tubes and hard valve flip-flop circuits.

I claim:

1. A ring counter comprising a plurality of counter stages including first and last stages; separate coupling means between each of said counter stages connecting said stages into a closed loop; each of said counter stages having a first and second stable state and comprising an "off" input circuit means for switching each stage from said second state to said first state upon the introduction of an off pulse, and each of said counter stages except said first stage having an "on" input circuit means arranged to receive a signal from the preceding stage through said separate coupling means when said preceding stage is swiched to said second state to permit the stage to switch to said second state upon the introduction of an "on" pulse; the said separate coupling means between said first and last stages arranged to switch said first stage to said second state when said last stage switches from said second state to said first state; pulse generating means for generating an "off" pulse upon the receipt of a trigger pulse and coupled to the "off" input means of each of said stages, the said pulse generating means further generating an "on" pulse following generation of said "off" pulse which is coupled to each said "on" input circuit means; reset means coupled to all of said stages except said first stage for sensing when each of these stages is in said second state and further coupled to each of said stages for switching said first stage to said second state and all other of said stages to said first state at the time when the sensed stages are all in said second state; and feedback means coupled from said last stage to the "on" input means of the second stage—immediately following said first stage, to deliver a signal when said last stage is switched to said second state to enable said second stage to switch to said second state upon application of the next "on" pulse, notwithstanding the absence of a signal from said first stage.

2. The device as claimed in claim 1 wherein the number of counting stages is three.

3. The device as claimed in claim 1 wherein the number of counting stages is four.

4. The device as claimed in claim 1 wherein the number of counting stages is five.

References Cited in the file of this patent

UNITED STATES PATENTS

| | | |
|---|---|---|
| 2,562,591 | Wagner et al. | July 31, 1951 |
| 2,594,336 | Mohr | Apr. 29, 1952 |
| 2,623,170 | Dickinson | Dec. 23, 1952 |
| 2,719,227 | Gordon | Sept. 27, 1955 |